(12) United States Patent
Ogasahara et al.

(10) Patent No.: US 9,162,328 B2
(45) Date of Patent: Oct. 20, 2015

(54) BRAZING METHOD

(71) Applicant: MITSUBISHI HEAVY INDUSTRIES, LTD., Tokyo (JP)

(72) Inventors: Tomoko Ogasahara, Tokyo (JP); Kosuke Nishikawa, Tokyo (JP); Noriyuki Hiramatsu, Tokyo (JP); Akira Fukushima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 33 days.

(21) Appl. No.: 14/132,491

(22) Filed: Dec. 18, 2013

(65) Prior Publication Data
US 2015/0041522 A1 Feb. 12, 2015

(30) Foreign Application Priority Data
Aug. 9, 2013 (JP) .................. 2013-166548

(51) Int. Cl.
*B23K 31/02* (2006.01)
*B23P 6/04* (2006.01)
*B23K 1/20* (2006.01)
*B23K 1/00* (2006.01)
*B23K 1/19* (2006.01)
*B23K 35/02* (2006.01)

(52) U.S. Cl.
CPC .................. *B23P 6/04* (2013.01); *B23K 1/0008* (2013.01); *B23K 1/19* (2013.01); *B23K 1/20* (2013.01); *B23K 1/206* (2013.01); *B23K 35/02* (2013.01); *B23K 2203/14* (2013.01)

(58) Field of Classification Search
None
See application file for complete search history.

(56) References Cited

U.S. PATENT DOCUMENTS

| | | | | |
|---|---|---|---|---|
| 2,999,124 A * | 9/1961 | Burke | ............ | 174/84 R |
| 3,346,951 A * | 10/1967 | Gwyn, Jr. | ............ | 29/879 |
| 5,348,212 A * | 9/1994 | Galanes | ............ | 228/135 |
| 6,283,356 B1 * | 9/2001 | Messelling | ............ | 228/119 |
| 6,589,594 B1 * | 7/2003 | Hembree | ............ | 438/106 |
| 8,235,275 B1 * | 8/2012 | Stankowski et al. | ............ | 228/56.3 |
| 2001/0025417 A1 * | 10/2001 | Fried et al. | ............ | 29/889.1 |
| 2005/0067466 A1 * | 3/2005 | Boegli et al. | ............ | 228/119 |
| 2005/0274009 A1 * | 12/2005 | Powers | ............ | 29/889.1 |
| 2008/0290137 A1 * | 11/2008 | Budinger | ............ | 228/119 |
| 2009/0255981 A1 * | 10/2009 | Singer et al. | ............ | 228/119 |
| 2009/0283572 A1 * | 11/2009 | Volek | ............ | 228/119 |
| 2010/0215984 A1 * | 8/2010 | Oiwa et al. | ............ | 428/680 |
| 2011/0174867 A1 * | 7/2011 | Galic et al. | ............ | 228/119 |

(Continued)

FOREIGN PATENT DOCUMENTS

JP 04-367382 12/1992
JP 2000-199025 A * 7/2000
JP 3741547 2/2006

*Primary Examiner* — Kiley Stoner
(74) *Attorney, Agent, or Firm* — Wenderoth, Lind & Ponack, L.L.P.

(57) ABSTRACT

A brazing method includes fixing a padding plate on a base material such that the padding plate is arranged in a lower position from a groove formed in a repair region of the base material, and heating the base material such that a base material powder is melt, after a paste that base material 1 contains the base material powder which is formed from a same material as the base material is filled into the groove. The base material powder filled into groove can be prevented from flowing out from the groove even if being fused since the padding plate is arranged for the base material. Thus, a repair region can be repaired more appropriately.

13 Claims, 3 Drawing Sheets

(56) References Cited

U.S. PATENT DOCUMENTS

| | | | |
|---|---|---|---|
| 2012/0211548 A1* | 8/2012 | Clark et al. | 228/119 |
| 2013/0020377 A1* | 1/2013 | Stankowski et al. | 228/119 |
| 2014/0220376 A1* | 8/2014 | Schick et al. | 428/615 |
| 2014/0301769 A1* | 10/2014 | Kinoshita et al. | 403/30 |
| 2015/0033559 A1* | 2/2015 | Bruck et al. | 29/889.1 |
| 2015/0034266 A1* | 2/2015 | Bruck et al. | 164/69.1 |

* cited by examiner

BRAZING METHOD

CROSS REFERENCE

This application claims a priority on convention based on Japanese Patent Application NO. 2013-166548. The disclosure thereof is incorporated herein by reference.

TECHNICAL FIELD

The present invention relates to a brazing method, and more particularly relates to a brazing method used when a defect generated in a base material is repaired.

BACKGROUND ART

A TiAl intermetallic compound that contains titanium and aluminum is known. The TiAl intermetallic compound is applied to parts that are required to be high in heat resistance and light in weight. As the parts, parts for a flying vehicle and an aerospace engine are exemplified. When the TiAl intermetallic compound is mechanically worked, a crack and a break are easily generated therein. When the crack and break are generated in the part made of the TiAl intermetallic compound, a region where the crack and the break are generated is required to be built up. The part made of the TiAl intermetallic compound is typically brittle, and when a filler material made of the same material as the base material is used to perform an buildup welding operation, a residual stress generated in the buildup welding portion is high, and a ductility is low. Thus, the break is easily generated, and the repairing work is difficult. For this reason, a brazing work that uses the filler material made of material different from the TiAl intermetallic compound is applied to the buildup welding operation to the part made of the TiAl intermetallic compound. It is desired to adequately repair the brittle base material that is exemplified for the TiAl intermetallic compound.

Japanese Patent No. 3,741,547 discloses a brazing method of using a diffusion brazing work of a part made of titanium aluminide that can attain a sufficient quality standard which is especially required in an aircraft field. A brazing method includes (a) a step of preparing a homogeneous mixture of a powder A and a powder B, (b) a step of mixing an organic binder with the powder mixture obtained in the step (a) to prepare a paste, (c) a step of depositing the paste to cover a gap of the part, and (d) a step of heating an assembly obtained in the step (c) in a vacuum furnace at a temperature between 1000° C. and 1300° C. for several minutes to 6 hours. The powder A is made of a titanium alminide alloy corresponding to a weight ratio of 40 to 90% of the total amount of the homogenous mixture. The powder B is made of an alloy, which has a melting point lower than a melting start temperature of the powder A, and contains as a main component, titanium or copper that allows the powder A to be chemically moistened, and corresponds to a weight ratio of 10 to 60% of the total amount of the homogeneous mixture (here, the above weight ratio between the powder A and the powder B is determined on the basis of an operation parameter of a method, a temperature and a granularity of a powder).

JP H04-367382A discloses a bonding body of a high strength TiAl in which a bonding condition is relaxed so as to improve a bonding portion quality. The bonding body of the high strength TiAl contains two TiAl intermetallic compound layers that are substances intended to be bonded, and two diffusion layers and a metal Ti layer. The two diffusion layers include a $Ti_3Al$ intermetallic compound layer provided between the two TiAl intermetallic compound layers. The metal Ti layer serves as an insertion material provided between the two diffusion layers.

CITATION LIST

[Patent Literature 1] Japanese Patent No. 3,741,547
[Patent Literature 2] JP H04-367382A

SUMMARY OF THE INVENTION

An object of the present invention is to provide a brazing method of more appropriately repairing a defect formed in a base material.

The brazing method by the present invention includes fixing a padding plate on a base material such that the padding plate is arranged at a lower position in a vertical direction from a groove which is formed in a repair region of the base material; and heating the base material such that base material powder is melt, after a paste comprising a base material powder which is formed of a same material as the base material is filled in the groove. A mixture paste of the base material powder and a brazing filler material powder which are filled into the groove sometimes flows out from the groove if being fused when the padding plate is not arranged for the base material. According to such a brazing method, the mixture paste can be prevented from flowing out from the groove by the padding plate when the brazing filler material is fused. This brazing method can repair a repair region more appropriately, as compared with a brazing method in which a padding plate is not used.

The base material is formed of an intermetallic compound which comprises titanium and aluminum, and the intermetallic compound has a γ phase, a β phase, and an α2/γ lamellar phase. The base material formed of an intermetallic compound is easy to generate a crack through a mechanical work. The brazing method of the present invention can repair the base material formed of such an intermetallic compound more appropriately.

The brazing method of the present invention further includes: coating a base material paste in the groove; and coating a brazing material paste to the groove after the base material paste is coated in the groove. The base material paste includes the base material powder, and the brazing material paste comprises a brazing material powder which is formed from an alloy which comprises titanium, copper and nickel. The base material is heated after the brazing material paste is coated to the groove. According to such a brazing method, the base material powder is filled in the groove with the brazing material powder such that they are fused more appropriately, and the repair region can be repaired more appropriately.

The particle diameter of the base material powder is greater than that of the brazing material powder. According to such a brazing method, the brazing material powder invades the crack of the base material powder in the groove and can repair more appropriately in the plurality of repair regions.

The padding plate is formed from the same material as the base material. The brazing material powder sometimes causes erosion to base material when the brazing material powder is fused, but the brazing method of the present invention can repair the repair region more appropriately.

The padding plate is fixed on the base material through a foil which is formed of titanium. According to such a brazing method, the padding plate is firmly fixed to the base material and can be prevented from dropping down from the base material. Thus, the repair region can be repaired more appropriately.

The brazing method of the present invention further includes: forming the groove in the base material such that a surface portion of a thickness reducing portion in the repair region is removed. In such a brazing method, a surface of a thickness reducing portion is removed when the surface of the thickness reducing portion is polluted formed in repair area is oxidized, so that the repair region can be repaired more appropriately.

The base material is heated when a plurality of grooves are formed and the plurality of grooves are filled with a plurality of the pastes. Such a brazing method can repair the plurality of grooves in parallel and speedily.

According to the brazing method of the present invention, the mixture paste of the base material powder and the brazing filler material powder can be prevent from flowing out from the groove formed in the base material and the repair region can be repaired more appropriately.

DESCRIPTION OF EMBODIMENTS

Figure 1:
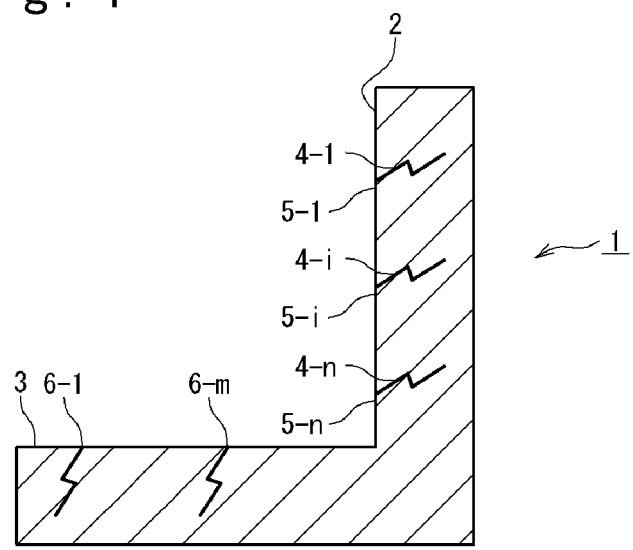
FIG. 1 is a cross-sectional view showing a base material that is repaired by a brazing method according to the present invention.

Hereinafter, a brazing method according to embodiments of the present invention will be described with reference to the attached drawings. FIG. 1 shows a base material 1 repaired by the brazing method. The base material 1 is made of an intermetallic compound that contains titanium and aluminium. The intermetallic compound has a γ phase, a β phase and an α2/γ lamellar phase. The intermetallic compound is well-known, and for example, is disclosed in Japanese Patent No. 3,741,547 and JP H04-367382A. The base material 1 is brittle, and a crack and a break are easily generated therein. When this is casted or worked, there is a case that the crack and the break are generated in a surface.

In the base material 1, a vertical surface 2 and a horizontal surface 3 are formed by forging. The vertical surface 2 is formed such that the vertical surface 2 is located along a vertical plane when the base material 1 is put in a predetermined attitude. The horizontal surface 3 is formed such that the horizontal surface 3 is located along a plane orthogonal to the vertical plane when the base material 1 is put in the predetermined attitude.

In the base material 1, a plurality of cracks are generated in the surface. The plurality of cracks are generated when the base material 1 is produced or manufactured. The plurality of cracks include cracks generated when the base material 1 is forged; cracks generated when the base material 1 is hot-worked; and cracks generated when the base material 1 is cold-worked. The plurality of cracks include a plurality of cracks 4-1 to 4-n (n=2, 3, 4, . . . ) generated in the vertical surface 2, and a plurality of cracks generated in the horizontal surface 3.

Figure 2:
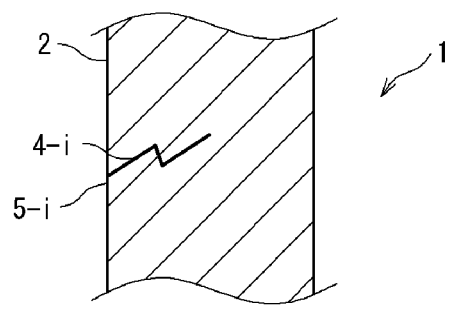
FIG. 2 is a cross-sectional view showing a defect that is generated in the base material.

One crack 4-i (i=1, 2, 3, . . . , n) of the plurality of cracks 4-1 to 4-n is generated such that the vertical surface 2 is split, as shown in FIG. 2. There is a case that an impurity is deposited on the surface of the base material where the crack 4-i is generated. As the impurity, floating matters floating in an atmosphere in which the base material 1 is arranged, and oxide produced as a result of that the surface of the base material is oxidized are exemplified. Each of the plurality of cracks generated in the horizontal surface 3 is generated such that the horizontal surface 3 is split, similarly to the crack 4-i.

In the base material 1, a plurality of repair regions 5-1 to 5-n corresponding to the plurality of cracks 4-1 to 4-n are set. The plurality of repair regions 5-1 to 5-n are set such that the crack 4-i of the plurality of cracks 4-1 to 4-n is arranged in the repair region 5-i of the plurality of repair regions 5-1 to 5-n.

In the base material 1, a plurality of repair regions 6-1 to 6-m (m=2, 3, 4, . . . ) corresponding to the plurality of cracks generated in the horizontal surface 3 are further set. The plurality of repair regions 6-1 to 6-m are set such that a certain crack of the plurality of cracks generated in the horizontal surface 3 is arranged in the repair region 6-j (j=1, 2, 3, . . . ) corresponding to the crack of the plurality of repair regions 6-1 to 6-m.

The brazing method according to the embodiment of the present invention contains a groove working operation, an operation of arranging a padding plate, an operation of applying or coating a base material paste, an operation of applying or coating a brazing filler material paste, a heating operation and a finishing operation.

Figure 3:
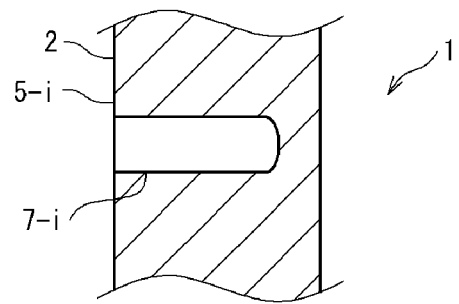
FIG. 3 is a cross-sectional view showing a groove formed in the base material.

The groove working operation forms a plurality of grooves corresponding to the plurality of repair regions 5-1 to 5-n and forms a plurality of grooves corresponding to the plurality of repair regions 6-1 to 6-m. A groove 7-i of the plurality of grooves corresponding to the repair region 5-i is formed such that the entire of the crack 4-i generated in the repair region 5-i is removed from the base material 1, as shown in FIG. 3. The width of the groove 7-i of about 5 mm is exemplified. The depth of the groove 7-i of about 10 mm is exemplified. The length of the groove 7-i of about 60 mm is exemplified. The groove 7-i is formed by operating a tool by a worker. The groove of the plurality of grooves corresponding to the repair region 6-i is formed similarly to the groove 7-i.

Figure 4:
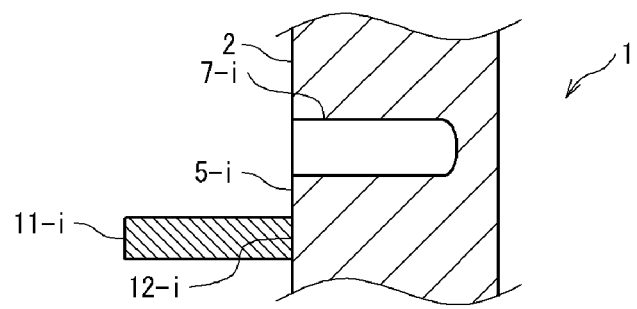
FIG. 4 is a cross-sectional view showing a padding plate that is fixed to the base material.

The operation of arranging the padding plate firstly prepares a plurality of padding plates corresponding to the plurality of repair regions 5-1 to 5-n. Each of the padding plates is plate-shaped and made of the same intermetallic compound as the base material 1. A padding plate 11-i of the plurality of padding plates corresponding to the repair region 5-i is bonded through a foil 12-i on the lower side of the groove 7-i for the repair region 5-i in the vertical direction, as shown in FIG. 4. The foil 12-i is made of metallic titanium. The padding plate 11-i is bonded for the repair region 5-i by operating a tool by the worker. A method of strongly bonding the padding plate 11-i to the base material 1 through the foil 12-i is known and disclosed in, for example, JP H04-367382A.

Figure 5:
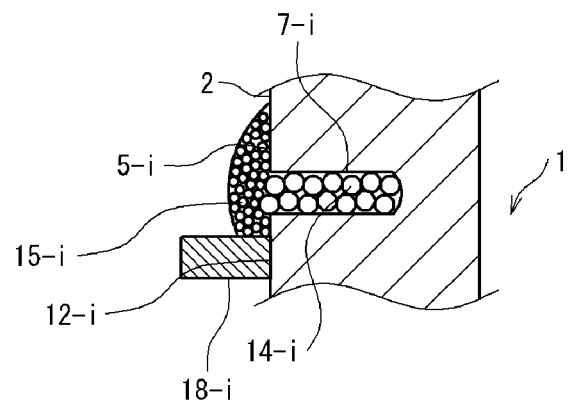
FIG. 5 is a cross-sectional view showing pastes that is coated to the groove.
Figure 6:
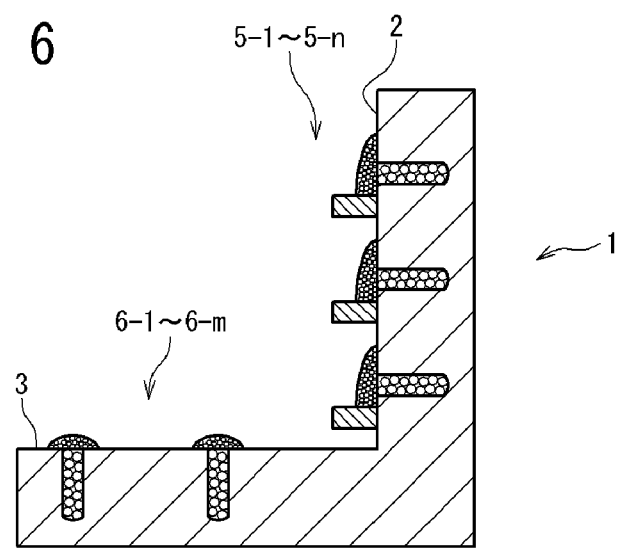
FIG. 6 is a cross-sectional view showing the base material before the base material is heated.

The operation of coating the base material paste firstly prepares the base material paste. The base material paste is formed by mixing a base material powder and an organic solvent based binder. The base material powder is made of the same intermetallic compound as the base material 1. As a particle diameter of the base material powder, about 100 μm is exemplified. The base material paste is coated on or filled in each of the plurality of grooves 7-1 to 7-n that are formed in the plurality of repair regions 5-1 to 5-n and coated on or filled in each of the plurality of grooves that are formed in the plurality of repair regions 6-1 to 6-m. The base material paste 14-i is coated on the groove 7-i to fill the groove 7-i, as shown in FIG. 5. Also, the base material paste is coated to fill each of the plurality of grooves formed in the plurality of repair regions 6-1 to 6-m, similarly to the groove 7-i.

The operation of coating the brazing filler material paste firstly prepares the brazing filler material paste. The brazing filler material paste is formed by mixing a brazing filler material powder and an organic solvent binder base. The brazing filler material powder is made from an alloy that contains titanium, copper and nickel. The alloy includes titanium as a main component. The concentration of the copper in the alloy is in a range of 5 wt. % to 20 wt. %. The concentration of nickel in the alloy is in a range of 5 wt. % to 20 wt. %. A particle diameter of the brazing filler material powder is smaller than a particle diameter of the base material powder. The particle diameter of the brazing filler material powder is in a range of 45 μm or less.

The brazing filler material paste is coated on each of the plurality of grooves, after the base material paste is coated to fill each of the plurality of grooves. That is, the brazing filler material paste 15-i is coated on the groove 7-i, after the base material paste 14-i is coated to fill the groove 7-i. At this time, the brazing filler material paste 15-i is coated on the groove 7-i after the base material paste 14-i is coated to fill the groove 7-i, so that the brazing filler material powder is diffused into the base material powder to fill the groove 7-i. Also, the brazing filler material paste is coated to fill each of the plurality of grooves formed in the plurality of repair regions 6-1 to 6-m, similarly to the groove 7-i.

The heating operation is performed after the brazing filler material paste is coated on all of the plurality of grooves. The base material 1 is firstly arranged inside a heating furnace (not shown). When the base material 1 is arranged inside the heating furnace, the inside of the heating furnace is sealed from environment. In the heating furnace, after the inside of the heating furnace is sealed, an exhausting unit (not shown) exhausts gas from inside the heating furnace so that the atmosphere in which the base material 1 is arranged arrives at a predetermined vacuum degree. The predetermined vacuum degree is an atmospheric pressure lower than $10^{-3}$ Pa. When the atmospheric pressure is equal to or less than the predetermined vacuum degree, the base material 1 is heated by the heating furnace so that the base material 1 is held at a predetermined temperature for a predetermined time period. The predetermined temperature is a temperature, which is lower than the melting point of the intermetallic compound of the base material 1 and higher than the melting point of an alloy of the brazing filler material powder. For example, a temperature between 1000° C. and 1200° C. is exemplified. As the predetermined time period, a time period between five minutes and 10 minutes is exemplified.

The base material 1 is cooled after the base material 1 is held at the predetermined temperature for a predetermined time period. As the predetermined time period, a time period between five minutes and 10 minutes is exemplified. In the heating furnace, after the base material 1 is sufficiently cooled, the exhausting unit supplies air to the inside of the heating furnace. When the atmospheric pressure inside the heating furnace is sufficiently increased, the heating furnace is opened, and the base material 1 is taken out from inside the heating furnace.

The brazing filler material powder is melted when the base material 1 is held at the above-mentioned temperature for the above-mentioned time period. The base material powder is melted when the base material powder is brought into contact with the melted brazing filler material powder. The melted brazing filler material is solidified when the base material 1 is cooled. The plurality of grooves are built up when the brazing filler material is solidified. An operation of building up a thickness reducing portion by using the base material powder and brazing filler material powder is known and disclosed in, for example, Japanese Patent No. 3,741.547.

In the finishing operation, after the brazing filler material is sufficiently solidified in the plurality of repair regions 5-1 to 5-n and the plurality of repair regions 6-1 to 6-m, the vertical surface 2 of the base material 1 is mechanically worked such that the protrusions generated on the vertical surface 2 by the solidified brazing filler material are removed. The horizontal surface 3 is mechanically worked such that the protrusions generated on the horizontal surface 3 by the solidified brazing filler material are removed.

According to the above brazing method of the present invention, the padding plate 11-i prevents the brazing filler material melted inside the groove 7-i from flowing out from the groove 7-i and from flowing into the lower direction along the vertical surface 2. Moreover, according to the brazing method of the present invention, the brazing filler material melted inside the grooves formed in the plurality of repair regions 6-1 to 6-m are prevented from flowing out from the grooves by the force of gravity. For this reason, according to the brazing method of the present invention, the brazing filler material melted inside the groove 7-i can be solidified inside the groove 7-i more surely, and the groove 7-i can be built up more surely, and the base material 1 can be repaired more adequately, as compared with a brazing method in which the padding plate is not arranged on the lower side of the groove 7-i.

According to the brazing method of the present invention, since the padding plate 11-i is made of the same intermetallic compound as the base material powder, bad influence to the brazing filler material can be suppressed even when the melted brazing filler material is brought into contact with the padding plate 11-i, as compared with a case where a padding plate is made of a material that is likely to have the worse influence on the melted brazing filler material. For this reason, according to the brazing method of the present invention, the base material 1 can be repaired more adequately.

According to the brazing method of the present invention, the base material paste and the brazing filler material paste, which are filled in the plurality of grooves formed in the base material 1, are melted when the base material 1 is entirely heated. For this reason, according to the brazing method of the present invention, the plurality of cracks generated in the base material 1 can be repaired easily and quickly, as compared with a brazing method that individually heats the plurality of grooves in which the base material paste and the brazing filler material paste are filled.

It should be noted that the groove working operation may be omitted in the brazing method according to the present invention. This brazing method can be applied, for example, when the crack 4-i is sufficiently large to an extent that the base material paste and the brazing filler material paste can be coated, and when a surface portion in which the crack 4-i is generated is sufficiently clean to an extent that the surface of the base material does not have bad influence on the buildup. Also, similarly to the brazing method in the embodiments, the brazing method can prevent the brazing filler material from flowing out from the crack 4-i and can repair the defect generated in the base material 1 more adequately.

It should be noted that the padding plate 11-i may be replaced with a padding plate that is directly bonded to the base material 1. Such a padding plate can be applied to a case where the padding plate can be bonded with a sufficient strength even when the padding plate is directly bonded to the base material 1 without any intervention of the foil 12-i. Also, similarly to the brazing method in the above embodiments, the brazing method to which the padding plate is applied can prevent the brazing filler material from flowing out from the groove 7-*i* and can repair the defect generated in the base material 1 more adequately.

It should be noted that the padding plate 11-*i* may be replaced with a padding plate made of a material different from the intermetallic compound of the base material 1. In the brazing method to which such a padding plate is applied, when the material of the padding plate is unlikely to have the bad influence on the melted brazing filler material, it is possible to prevent the brazing filler material from flowing out from the groove 7-*i* and repair the defect generated in the base material 1 more adequately, similarly to the brazing method in the above embodiments.

It should be noted that by coating a paste different from the base material paste and different from the brazing filler material paste, it is possible to fill the base material powder and the brazing filler material powder in the groove 7-*i*. As the paste, a paste produced by mixing the base material powder, the brazing filler material paste and an organic solvent based binder is exemplified. Similarly to the brazing method in the above embodiments, even the brazing method to which the above paste is applied can prevent the brazing filler material from flowing out from the groove 7-*i* and can repair the defect generated in the base material 1 more adequately.

It should be noted that the plurality of repair regions 5-1 to 5-*n* may be individually heated after the base material paste and the brazing filler material paste are coated. This brazing method can prevent the brazing filler material from flowing out from the groove 7-*i* and can repair the defect generated in the base material 1 more adequately, similarly to the brazing method in the above embodiments.

It should be noted that the brazing method according to the present invention can be also applied to the repairing a base material made of a metallic material different from the intermetallic compound which contains titanium and aluminum. At this time, the brazing filler material powder is made of a material that changes to a melted alloy from a contact portion at a temperature equal to or lower than the melting point of the metallic material, when the brazing filler material powder is in contact with the metallic material. In this case, according to the above brazing method, the base material can be repaired more adequately, similarly to the base material 1.

What is claimed is:

1. A brazing method comprising:
   fixing a padding plate on a base material such that the padding plate is arranged at a lower position in a vertical direction from a groove which is formed in a repair region of the base material;
   filling the groove with a paste comprising a base material powder which is formed of a same material as the base material; and
   heating the base material such that the base material powder is melted,
   wherein the padding plate is formed of a same material as the base material.

2. The brazing method according to claim 1, wherein the base material is formed of an intermetallic compound which comprises titanium and aluminum, and
   wherein the intermetallic compound has a γ phase, a β phase, and an α2/γ lamellar phase.

3. The brazing method according to claim 2, further comprising:
   filling the groove with a base material paste; and
   applying a brazing material paste to cover the groove after the groove is filled with the base material paste,
   wherein the base material paste comprises the base material powder,
   wherein the brazing material paste comprises a brazing material powder which is formed of an alloy which comprises titanium, copper and nickel, and
   wherein the base material is heated after the groove is filled with the base material paste.

4. The brazing method according to claim 3, wherein a particle diameter of the base material powder is greater than that of the brazing material powder.

5. The brazing method according to claim 1, wherein the padding plate is fixed on the base material through a foil which is formed of titanium.

6. The brazing method according to claim 1, further comprising:
   forming the groove in the base material such that a crack formed in a surface of the repair region is removed.

7. The brazing method according to claim 1, wherein the base material is heated when a plurality of grooves are formed and the plurality of grooves are filled with the paste.

8. A brazing method comprising:
   fixing a padding plate on a base material such that the padding plate is arranged at a lower position in a vertical direction from a groove which is formed in a repair region of the base material;
   filling the groove with a paste comprising a base material powder which is formed of a same material as the base material; and
   heating the base material such that the base material powder is melted,
   wherein the padding plate is fixed on the base material through a foil which is formed of titanium.

9. The brazing method according to claim 8, wherein the base material is formed of an intermetallic compound which comprises titanium and aluminum, and
   wherein the intermetallic compound has a γ phase, a β phase, and an α2/γ lamellar phase.

10. The brazing method according to claim 9, further comprising:
    filling the groove with a base material paste; and
    applying a brazing material paste to cover the groove after the groove is filled with the base material paste,
    wherein the base material paste comprises the base material powder,
    wherein the brazing material paste comprises a brazing material powder which is formed of an alloy which comprises titanium, copper and nickel, and
    wherein the base material is heated after the groove is filled with the base material paste.

11. The brazing method according to claim 10, wherein a particle diameter of the base material powder is greater than that of the brazing material powder.

12. The brazing method according to claim 8, further comprising:
    forming the groove in the base material such that a crack formed in a surface of the repair region is removed.

13. The brazing method according to claim 8, wherein the base material is heated when a plurality of grooves are formed and the plurality of grooves are filled with the paste.

* * * * *